United States Patent
Blick et al.

(10) Patent No.: US 8,092,739 B2
(45) Date of Patent: Jan. 10, 2012

(54) RETRO-PERCUSSIVE TECHNIQUE FOR CREATING NANOSCALE HOLES

(75) Inventors: Robert H. Blick, Madison, WI (US); Minrui Yu, Madison, WI (US); Hua Qin, Madison, WI (US); Hyun-Seok Kim, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 7 days.

(21) Appl. No.: 12/277,900

(22) Filed: Nov. 25, 2008

(65) Prior Publication Data
US 2010/0129603 A1    May 27, 2010

(51) Int. Cl.
B29C 35/08    (2006.01)
(52) U.S. Cl. .................................. 264/400
(58) Field of Classification Search ............ 264/400
See application file for complete search history.

(56) References Cited

U.S. PATENT DOCUMENTS

| | | | |
|---|---|---|---|
| 2005/0009171 A1* | 1/2005 | Fertig et al. | 435/287.2 |
| 2006/0049156 A1* | 3/2006 | Mulloy et al. | 219/121.71 |

FOREIGN PATENT DOCUMENTS

| | | |
|---|---|---|
| DE | 19908630 A1 | 8/2000 |
| GB | 2096517 A | 10/1982 |
| WO | WO 00/69594 A1 | 11/2000 |

OTHER PUBLICATIONS

Derwent abstract of DE 19908630.*

Fertig, Niels, et al., Microstructured Apertures in Planar Glass Substrates for Ion Channel Research, Receptors and Channels, 9, pp. 29-40, 2003, Taylor & Francis, Oxford, UK.
Fertig, N., et al., Mictrostructured Glass Chip for Ion-Channel Electrophysiology, Physical Review E., Vo. 64, 040901(R), pp. 1-4, 200, American Physical Society, College Park, MD, USA.
Fertig, Niels, et al., Whole Cell Patch Clamp Recording Performed on a Planar Glass Chip, Biophysical Journal, Vo. 82, Jun. 2002, pp. 3056-3062, Biophysical Society, Bethesda, MD, USA.
Fertig, Niels, et al., Activity of Single Ion Channel Proteins Detected with a Planar Microstructure, Applied Physics Letters, vol. 81, No. 25, pp. 4865-4867, Dec. 16, 2002, American Institute of Physics, College Park, MD, USA.
Fertig, N., et al., Stable Integration of Isolated Cell Membrane Patches in a Nanomachined Aperture, Applied Physics Letters, vol. 77, No. 8, pp. 1218-1220, American Institute of Physics, College Park, MD, USA.
Li, Y., et al., Three-Dimensional Hole Drilling of Silica Glass from the Rear Surface with Femtosecond Laser Pulses, Optics Letters, vol. 26, No. 23, pp. 1912-1914, Dec. 1, 2001, OSA, Optical Society of America, Washington, DC, USA.
Purdie, Douglas, PCT International Search Report, Mar. 9, 2010, European Patent Office, Rijswijk, The Netherlands.

* cited by examiner

*Primary Examiner* — Christina Johnson
*Assistant Examiner* — Xue Liu
(74) *Attorney, Agent, or Firm* — Boyle Fredrickson, S.C.

(57) ABSTRACT

A method of forming extremely small pores in glass or a similar substrate, useful, for example, in patch clamp applications, that employs a backer plate to contain energy of a laser-induced ablation through the front surface of the substrate so as to create a rear surface shock wave providing a fire polishing of the exit aperture of the pore such as produces improved sealing with cell membranes.

9 Claims, 3 Drawing Sheets

RETRO-PERCUSSIVE TECHNIQUE FOR CREATING NANOSCALE HOLES

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to "patch clamping" for investigating ionic and molecular transport through cellular membranes via ion channels and, in particular, to a substrate providing a set of nano to microscale pores that may be readily sealed to cellular membranes.

The lipid bilayers that make up cell membranes include ion channels that control the flow of ions into and out of cells. Certain ion channels open in response to signaling molecules including naturally occurring signaling molecules and drug molecules. In the development of therapeutic drugs, it is necessary to determine the effect of the drug on ion channels either to avoid adverse effects or to create a positive therapeutic effect for the treatment of ion-channel related diseases.

Analysis of the response of ion channels may be conducted with a so-called "patch clamp", traditionally a micropipette adhered to the surface of a cell by a slight suction. An electrical connection to the interior of the cell can be made, for example, by applying a sharp suction pulse to the pipette to open a hole in the cell wall. Measurement of small electrical changes across the cell membrane may then be used to deduce the opening or closing of particular ion channels.

The small amount of electrical current involved in these measurements requires an extremely high resistance seal between the pipette and the cell wall (a gigaohm seal or gigaseal). Typically a gigaohm seal should be of the order of 15-20 gigaohms and at least 5 gigaohms.

Drug screening can require a large number of ion channel measurements. Accordingly, in current practice, the pipette can be replaced with a plate having multiple small pores each of which may accept a cell. The plate array allows the parallel processing of multiple cells and may be more readily integrated into automated equipment than a pipette.

The production of nanoscale holes in a plate structure is relatively difficult. One technique requires irradiating a glass or quartz substrate with heavy ions which leave behind a track of molecular damage that may preferentially be etched, for example, with hydrofluoric acid. The timing of the etch is controlled so that it breaks through on the far side of the substrate to produce the correct hole size.

The need for access to heavy ion accelerators for the production of nano-sized holes can be avoided by a second technique which employs a laser to ablate a crater through a pre-thinned glass substrate. By controlling the duration and power of the laser, a generally conical crater may break through the opposite side of the substrate with an appropriate size of hole.

One disadvantage to the laser approach is that it spreads molten glass and debris on the exit of the hole. This debris impedes proper adherence between the cell membrane and the lip of the hole leading to a reduction in the electrical resistance of the hole so formed.

SUMMARY OF THE INVENTION

The present invention provides an improved technique for the generation of nanoscale-sized pores through a substrate using a laser. In the technique, the substrate is backed by a thermally expanding substance different from the substrate. In the final stages of hole formation, the thermally expanding substance, heated by the laser, produces a shock wave creating a counter-facing concave crater intersecting the front surface of a crater being created by the laser. The shock wave is such as to fire polish the pore exit, substantially increasing the ability of the pore to form high resistance seals with cell membranes. Fire polishing uses heat or flame to melt irregularities which then smooth under the influence of surface tension.

Specifically then, the present invention provides a method of creating nanoscale holes comprising the steps of creating a layered structure comprising a substrate material receiving the nanoscale hole backed by a second, shock wave containing backer material adjacent to a rear face of the substrate material. A focused laser is applied for a first period to a front face of the substrate material to ablate a first crater opening at the front face of the substrate material and extending into the substrate material by an amount less than a thickness of the substrate material. The application of the focused laser is continued for a second period to heat material beyond the first crater to produce a shock wave generating a second crater starting at the rear face of the substrate material and extending into the substrate material to connect with the first crater thereby creating an opening between the first and second crater having a hole diameter.

It is thus an object of at least one embodiment of the invention to provide nanoscale sized pores that have reduced debris onto the rear surface of the substrate as occurs during standard laser hole formation.

The hole diameter may be less than 1000 nm.

It is thus an object of at least one embodiment of the invention to produce a pore size suitable for use in patch clamp applications.

The material may be transparent.

It is thus an object of at least one embodiment of the invention to provide a substrate material allowing transmission of light permitting both electrical and optical measurements of membranes.

The material to be drilled is borosilicate glass.

It is thus an object of at least one embodiment of the invention to provide a substrate suitable for use in electrophysiology applications.

The method may further include the step of pre-forming pockets in a front face of the substrate material and the first crater may be substantially centered within the pockets.

It is thus an object of at least one embodiment of the invention to permit an arbitrary thickness of the substrate as may be required for structural integrity.

The invention may employ a volatilizable material between the substrate material and the backer material.

It is thus an object of at least one embodiment of the invention to provide an increased pressure wave for improved hole formation.

The volatilizable substance may be water.

It is thus an object of at least one embodiment of the invention to permit the use of relatively safe volatilizable substances.

The volatilizable substance may be a liquid held between the material and the backer material by spacers defining the thickness of the volatilizable substance.

It is thus an object of at least one embodiment of the invention to permit precise control of the parameters of shock wave formation.

The focused laser may be applied so that the second crater reaches melting temperatures to create a fire polished surface.

It is thus an object of at least one embodiment of the invention to provide improved sealing surfaces to the aperture for the creation of higher resistance seals to cell membranes.

These particular features and advantages may apply to only some embodiments falling within the claims and thus do not define the scope of the invention.

DETAILED DESCRIPTION OF THE PREFERRED EMBODIMENT

Figure 1:
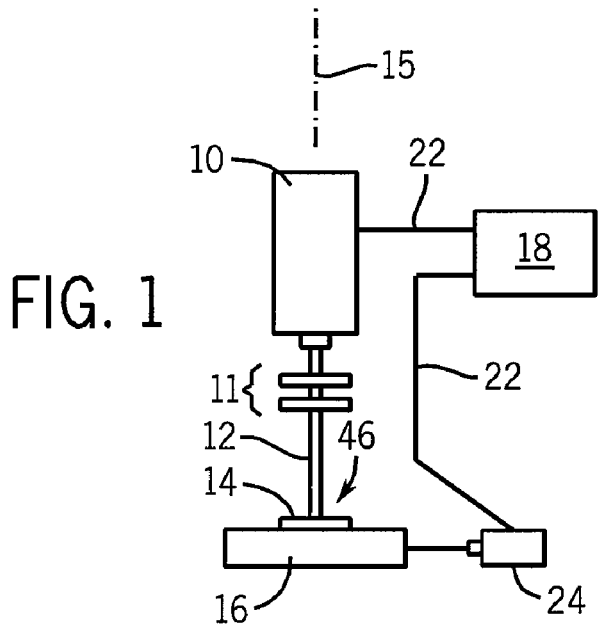
FIG. 1 is a schematic diagram of an apparatus used for producing a planar patch clamp plate per one embodiment of the present invention.

Referring now to FIG. 1, the present invention may use an excimer laser 10 having collimating and focusing optics 11 to direct a narrow collimated beam 12 of light along an axis 15 toward a front surface of a substrate assembly 14 held on a mechanical stage 16. The laser may, for example, have a frequency range of 192 to 157 nm.

The laser 10 and stage 16 may be controlled by an automated controller 18 of the type well known in the art providing control signals 22 to the laser 10 controlling its output power in a series of pulses as will be described and providing control signals 22 to actuator motors 24 providing x-y control of the stage 16.

Figure 2:
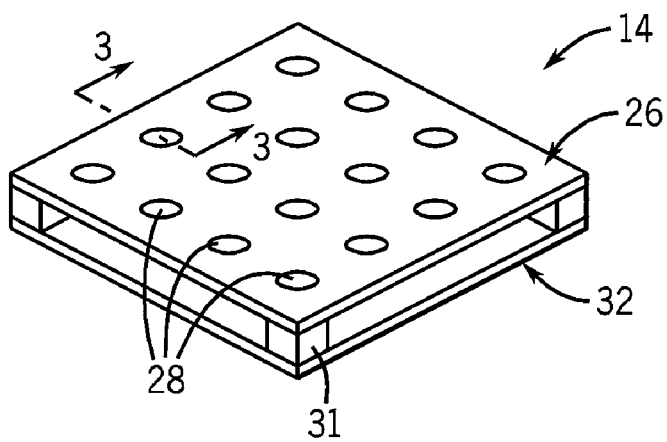
FIG. 2 is a block diagram of a patch clamp produced by the machine of FIG. 1.
Figure 3:
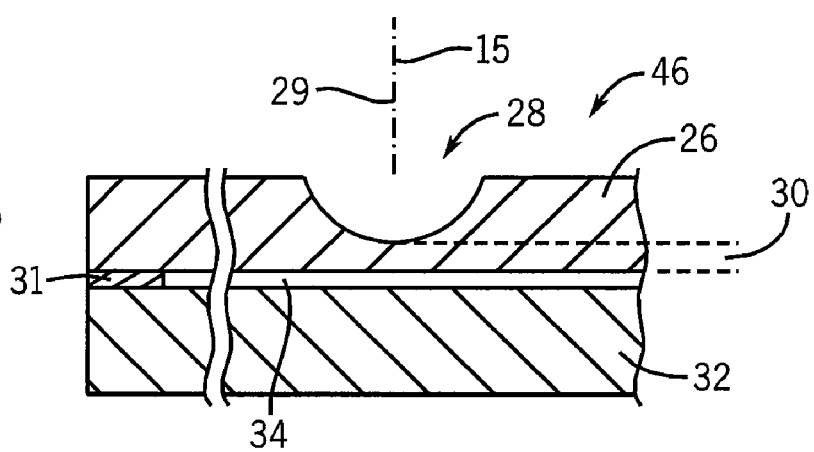
FIG. 3 is a cross-section along line 3-3 of FIG. 2 showing a spacing of a patch clamp substrate from a backer material by a gap filled with a volatile substance.

Referring now to FIGS. 2 and 3, the substrate assembly 14 may include an upper substrate 26, for example, a borosilicate cover slip having a thickness of approximately 150 microns. A front surface of the upper substrate 26 may have a series of depressions or wells 28 formed at regular x-y grid locations 29. The wells 28 provide a thinned portion 30 at the locations 29 measured along axis 15 having a thickness of 100 to 1000μ and may be molded, ground or etched in the substrate 26. The diameter of the wells 28 may be relatively large, for example, 5.0 mm and serve simply to permit a generally thicker substrate 26 in regions outside of the locations 29 for structural convenience.

The substrate 26 may have a backer plate 32 positioned adjacent to the rear surface of the substrate 26 and spaced therefrom by optional spacer 31 formed, for example, of polydimethylsiloxane (PDMS). The PDMS may be cast on the rear surface of the substrate 26 through a mold produced using integrated circuit techniques to provide precisely controlled spacer thickness or may be spun-coated and selectively removed except at the edges of the substrate 26.

The space between the substrate 26 and the backer plate 32 is filled with a volatile material 34, preferably water, but possibly other materials including, for example, acetone. The space between the substrate 26 and backer plate 32 must be determined by experiment depending on the particular laser and material of the backer plate 32 but can, for example, be as little as the separation provided strictly by the capillary forces of water without a separate spacer 31. In one embodiment, the substrate 26 and backer plate 32 may be substantially adjacent while nevertheless providing a thoroughly induced counter shock wave, e.g., proceeding in a direction opposite the ablation provided by the collimated beam 12.

Figure 4:
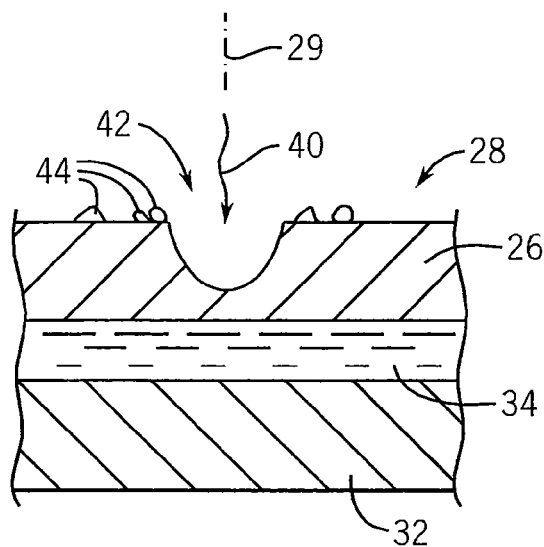
FIG. 4 is a figure similar to that of FIG. 3 showing an initial stage of laser ablation creating a first crater and showing the scattering of molten debris onto the front surface of the substrate.

Referring now to FIGS. 1 and 4, the excimer laser 10 may be positioned above a first location 29 and pulsed by the controller 18 to produce a series of controlled light pulses 40 of laser beam 12, the light pulses 40 absorbed by the material of the substrate 26 to ablate, over a first time, a first crater 42. Molten material 44 ejected from the crater 42 will generally adhere to a front surface 46 of the substrate 26 creating substantial surface roughness. The laser ablation is continued until the deepest portion of the crater 42 reaches a distance from three to 10 microns from the rear surface of the substrate 26.

Figure 5:
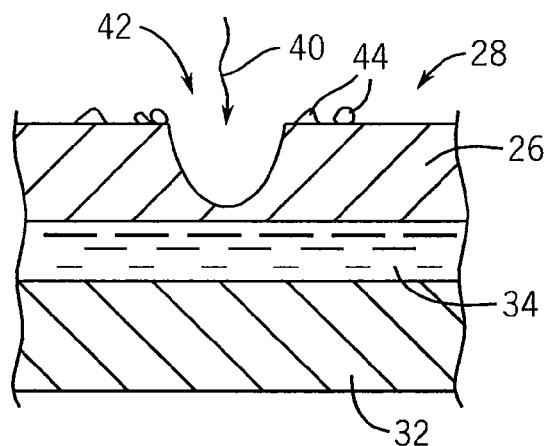
FIG. 5 is a figure similar to that of FIG. 3 showing transmission of energy through the substrate into the volatile substance before eruption of the first crater through the substrate.

Referring now to FIG. 5, although the Applicant does not wish to be bound by a particular theory, it is believed at this point, leakage energy from the pulses 40 passes through the remainder of the substrate 26 to heat material beyond the crater 42, preferably the volatile material 34 but possibly air or the rear surface of the substrate 26 itself hit by reflected energy.

Figure 6:
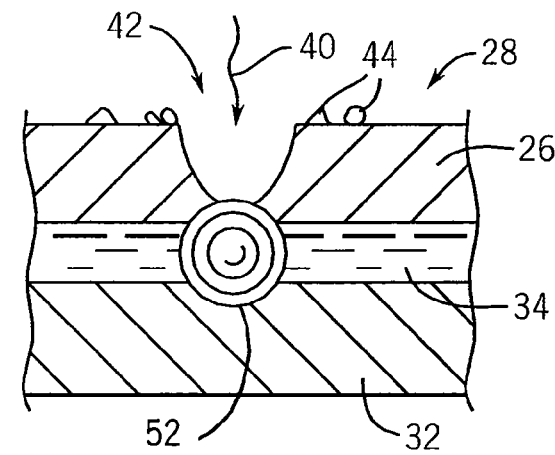
FIG. 6 is a figure similar to that of FIG. 5 showing the creation of a shock wave by a volatile substance behind the substrate.

As shown in FIG. 6, the effect of this leakage energy 50 of FIG. 5 is to create a rapid thermal expansion to generate a shock wave 52 starting at a point beyond the crater 42 and passing from the rear surface of the substrate 26 toward its front surface. The shock wave 52 is sufficiently powerful so as to create surface melting at the rear surface of the substrate 26 when contained by the backer plate 32.

Figure 7:
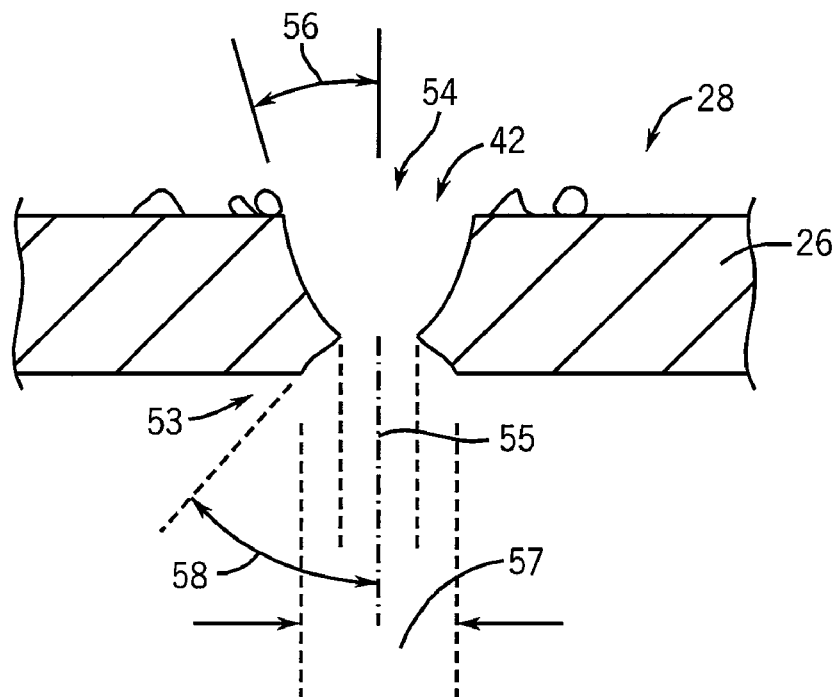
FIG. 7 is an enlarged view of the substrate of FIG. 6 after the shock wave showing the generation of a fire polished second crater counter to the first crater.

Referring to FIG. 7, the net result is an hourglass-shaped pore 54 passing through the substrate 26 formed by the intersection of crater 42 and a counter-facing crater 53 formed by the shock wave 52. The hourglass-shaped pore 54 has a waist diameter 55 representing the narrowest portion of the pore 54 of 1 to 200 microns and preferably substantially less than 1 micron for example 200 nm. The rear diameter 57 of the hourglass-shaped pore 54 formed by counter-facing crater 53 will generally be much larger than the waist diameter 55, typically at least twice as large.

A front portion of the hourglass-shaped pore 54 formed by the crater 42 will generally have a first small cone angle 56 to provide improved control of the waist diameter 55 by reducing the effect of the depth of the crater 53. A second cone angle 58 of the crater 53 may be substantially greater, for example, twice the angle 56. The diameter of the crater 53, for example, may be on the order of 10 microns and is essentially fire polished caused by the heating effect of the shock wave 52.

Figure 8:
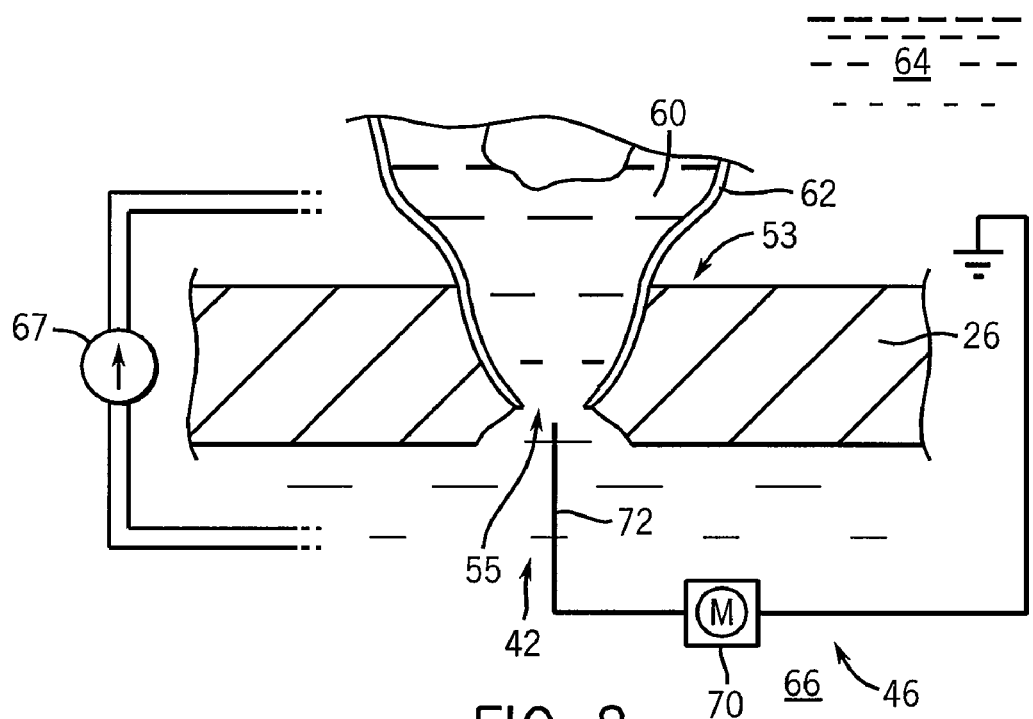
FIG. 8 is a simplified representation of the use of the substrate of FIG. 7 in a patch clamp application.

Referring to FIG. 8 the substrate 26 (inverted with respect to the orientation of FIG. 7) may receive a cell 60 within crater 53 to expose a portion of the cell wall 62 at the waist 55 to be accessible through crater 42. A light suction applied by a pump 67 from the side of the substrate 26 toward crater 42 may adhere the cell wall 62 to the surface of crater 53 with a 5 to 30 gigaohm resistance between a solution 64 on the side of the substrate 26 holding the cell 60 and a solution 66 on the side of the substrate 26 opposite solution 64.

A sharp suction applied by a pump 67 at the front surface 46 or other means may be used to provide electrical connection to the interior of the cell 60 by a sensitive electrical detector 70 permitting measurement of electrical differences between the exterior and interior of the cell 60 through an electrode 72 communicating with the interior of the cell 60 referenced to solution 64 outside the cell 60.

As used herein "fire polishing" is used to refer to a surface melting similar to that which would be provided by fire but does not require combustion.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of creating nanoscale holes comprising the steps of:
   (a) creating a layered structure comprising a substrate material receiving the nanoscale hole and a shock wave containing backer material adjacent to a rear face of the substrate material;
   (b) applying a focused laser in a direction of laser transmission and for a first period to a front face of the substrate material to ablate a first crater opening at the front face of the substrate material and extending into the substrate material by an amount less than a thickness of the substrate material;
   (c) applying the focused laser in the direction of laser transmission through the front surface and for a second period to heat material beyond the first crater to produce a shock wave generating a second crater starting at the rear face of the substrate material and extending into the substrate material in a direction that opposes the direction of laser transmission and to connect with the first crater thereby creating an opening between the first and second crater having a hole diameter wherein the second crater has a diameter at the rear face larger than the hole diameter.

2. The method of claim 1 wherein in the hole diameter is less than 1000 nm.

3. The method of claim 1 wherein the substrate material is transparent.

4. The method of claim 3 wherein the substrate material is borosilicate glass.

5. The method of claim 1 further including the step of pre-forming pockets in the front face of the substrate material and wherein the first crater is substantially centered within the pockets.

6. The method of claim 1 wherein the material that is heated includes a volatilizable substance.

7. The method of claim 6 wherein the volatilizable substance is a liquid and includes spacers between the substrate material and the backer material defining the thickness of the volatilizable substance.

8. The method of claim 1 wherein the focused laser is applied so that the second crater reaches melting temperatures to create a fire polished surface.

9. The method of claim 1 wherein the laser has a frequency of 192 to 157 nm.

* * * * *